US010565154B2

United States Patent
Kwon et al.

(10) Patent No.: US 10,565,154 B2
(45) Date of Patent: Feb. 18, 2020

(54) MOBILE DEVICE AND INTERFACING METHOD THEREOF THAT ADJUSTS CLOCK FREQUENCY BASED ON ACCESS MODE

(71) Applicant: SAMSUNG ELECTRONICS CO., LTD., Suwon-si, Gyeonggi-do (KR)

(72) Inventors: Jiwoong Kwon, Seoul (KR); Soo-Woong Lee, Gyeonggi-Do (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 16/056,691

(22) Filed: Aug. 7, 2018

(65) Prior Publication Data

US 2019/0213164 A1    Jul. 11, 2019

(30) Foreign Application Priority Data

Jan. 9, 2018   (KR) .................. 10-2018-0002874

(51) Int. Cl.
*G06F 13/00*   (2006.01)
*G06F 13/42*   (2006.01)
*G06F 1/12*    (2006.01)

(52) U.S. Cl.
CPC ............ *G06F 13/4282* (2013.01); *G06F 1/12* (2013.01)

(58) Field of Classification Search
CPC ........................ G06F 13/4282; G06F 1/12
See application file for complete search history.

(56) References Cited

U.S. PATENT DOCUMENTS

| 5,787,132 | A | * | 7/1998 | Kishigami | H04L 7/042 370/304 |
| 6,553,434 | B1 | | 4/2003 | Abkarian et al. | |
| 7,467,277 | B2 | | 12/2008 | Barnum et al. | |
| 7,697,369 | B2 | * | 4/2010 | Koshizuka | G11C 7/1051 365/230.06 |
| 7,949,818 | B2 | * | 5/2011 | Suyama | G11C 16/26 711/103 |
| 8,477,444 | B1 | | 7/2013 | Zou et al. | |
| 9,142,277 | B2 | | 9/2015 | Kim et al. | |
| 9,747,963 | B2 | * | 8/2017 | Lee | G06F 13/1684 |
| 10,277,387 | B2 | * | 4/2019 | Tsunoda | H03L 7/0807 |

(Continued)

FOREIGN PATENT DOCUMENTS

| JP | 2005202628 A | 7/2005 |
| JP | 2008217638 A | 9/2008 |
| JP | 5113433 B2 | 1/2013 |

*Primary Examiner* — Jing-Yih Shyu
(74) *Attorney, Agent, or Firm* — Volentine, Whitt & Francos, PLLC

(57) ABSTRACT

A mobile device includes a slave device that receives first data provided to a serial data line in synchronization with a clock signal provided through a serial clock line, and outputs second data to the serial data line in synchronization with the clock signal; and a master device that generates the clock signal and provides the first data to the serial data line in synchronization with the generated clock signal, or receives the second data output to the serial data line in synchronization with the clock signal. The master device generates the clock signal of a first frequency upon transmitting the first data, and generates the clock signal of a second frequency, which is lower than the first frequency, upon receiving the second data.

20 Claims, 11 Drawing Sheets

(56) References Cited

U.S. PATENT DOCUMENTS

| | | | |
|---|---|---|---|
| 2006/0104396 A1* | 5/2006 | Soriano | G06F 13/4282 |
| | | | 375/362 |
| 2008/0195806 A1* | 8/2008 | Cope | G06F 13/1684 |
| | | | 711/111 |
| 2008/0219083 A1 | 9/2008 | Chang | |
| 2014/0334243 A1* | 11/2014 | Duffner | G11C 7/00 |
| | | | 365/233.13 |
| 2016/0034189 A1 | 2/2016 | Kim et al. | |
| 2016/0117274 A1* | 4/2016 | Waters | G06F 13/362 |
| | | | 710/106 |
| 2016/0239235 A1 | 8/2016 | Chung et al. | |
| 2016/0342540 A1* | 11/2016 | Kannan | G06F 13/161 |
| 2017/0194971 A1* | 7/2017 | Yonezawa | H03L 7/095 |

* cited by examiner

MOBILE DEVICE AND INTERFACING METHOD THEREOF THAT ADJUSTS CLOCK FREQUENCY BASED ON ACCESS MODE

CROSS-REFERENCE TO RELATED APPLICATIONS

A claim for priority under 35 U.S.C. § 119 is made to Korean Patent Application No. 10-2018-0002874 filed on Jan. 9, 2018, in the Korean Intellectual Property Office, the disclosure of which is hereby incorporated by reference herein in its entirety.

BACKGROUND

The inventive concepts described herein relate to an electronic device, and more particularly to a mobile device including a master device and a slave device having a transmitting/receiving channel of an asynchronous band.

Currently, the use of mobile devices such as smartphones, tablet personal computers (PCs), digital cameras, MP3 players, and personal digital assistants (PDAs) is increasing significantly. Mobile devices are typically equipped with devices or components which perform various functions such as data exchange, electronic payment, wireless tag, image sensing, power control, and the like.

A general mobile device by design typically includes at least two devices or components connected to each other on a printed circuit board (PCB). As the number of pins included in such devices or components increases, manufacturing cost of mobile devices consequently increases. To reduce the number of pins of the devices, a serial interface is used to transmit data when communication speed is not critical and low speeds are acceptable. However, in the case of a serial interface, a channel for transmitting data and a channel for receiving data are limited to the same bandwidth.

To meet user need and to cope with varying communication environments, the number and types of devices or components included in mobile devices have increased. However, it has become increasingly difficult to improve function and performance due to bandwidth limitations between the devices or components of the mobile devices.

SUMMARY

Embodiments of the inventive concept provide a serial interface having different write and read bandwidths between devices included in a mobile device. Embodiments of the inventive concept also provide an interfacing method having a bandwidth that varies with a direction of data to be exchanged between the devices included in the mobile device.

Embodiments of the inventive concepts provide a mobile device including a slave device that receives first data provided to a serial data line in synchronization with a clock signal provided through a serial clock line, and outputs second data to the serial data line in synchronization with the clock signal; and a master device that generates the clock signal and provides the first data to the serial data line in synchronization with the generated clock signal and receives the second data from the serial data line in synchronization with the clock signal. The master device generates the clock signal as having a first frequency upon transmitting the first data, and generates the clock signal as having a second frequency upon receiving the second data. The second frequency is lower than the first frequency.

Embodiments of the inventive concepts also provide a mobile device including a slave device that communicates using a serial clock line and a serial data line; and a master device that transmits a clock signal to the slave device using the serial clock line and communicates with the slave device through the serial data line. The master device changes a frequency of the clock signal depending on a direction in which data are transmitted through the serial data line.

Embodiments of the inventive concepts further provide an interfacing method of a mobile device which includes a master device and a slave device connected through a bidirectional serial data line and a unidirectional serial clock line. The method includes detecting, by the master device, an access request to the slave device; determining, by the master device, whether the access request is a write request or a read request; upon determining that the access request corresponds to the read request, transmitting, by the master device, a clock signal as having a first frequency to the unidirectional serial clock line and a read command to the bidirectional serial data line in synchronization with the clock signal having the first frequency; and transmitting, by the master device, the clock signal as having a second frequency to the unidirectional serial clock line, and receiving, by the master device, read data transmitted through the bidirectional serial data line using the clock signal having the second frequency. The first frequency is higher than the second frequency.

Embodiments still further provide a mobile device including a master device and a slave device connected by a bidirectional serial data line and a unidirectional serial clock line. The master device is configured to detect an access request to the slave device, and determine whether the access request is a write request or a read request. The master device is further configured upon determining that the access request corresponds to the read request to transmit a clock signal as having a first frequency to the unidirectional serial clock line and a read command to the bidirectional serial data line in synchronization with the clock signal having the first frequency, to transmit the clock signal as having a second frequency to the unidirectional serial clock line, and receive read data transmitted through the bidirectional serial data line using the clock signal having the second frequency. The first frequency is higher than the second frequency.

BRIEF DESCRIPTION OF THE FIGURES

The above and other objects and features of the inventive concepts will become apparent in view of the following detailed description of exemplary embodiments as taken with reference to the accompanying drawings.

DETAILED DESCRIPTION

Hereinafter, embodiments of the inventive concepts will be described in detail with reference to the attached drawings to the extent that the embodiments of the inventive concepts may be easily implemented by a person of ordinary skill in the art to which the inventive concepts belong.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
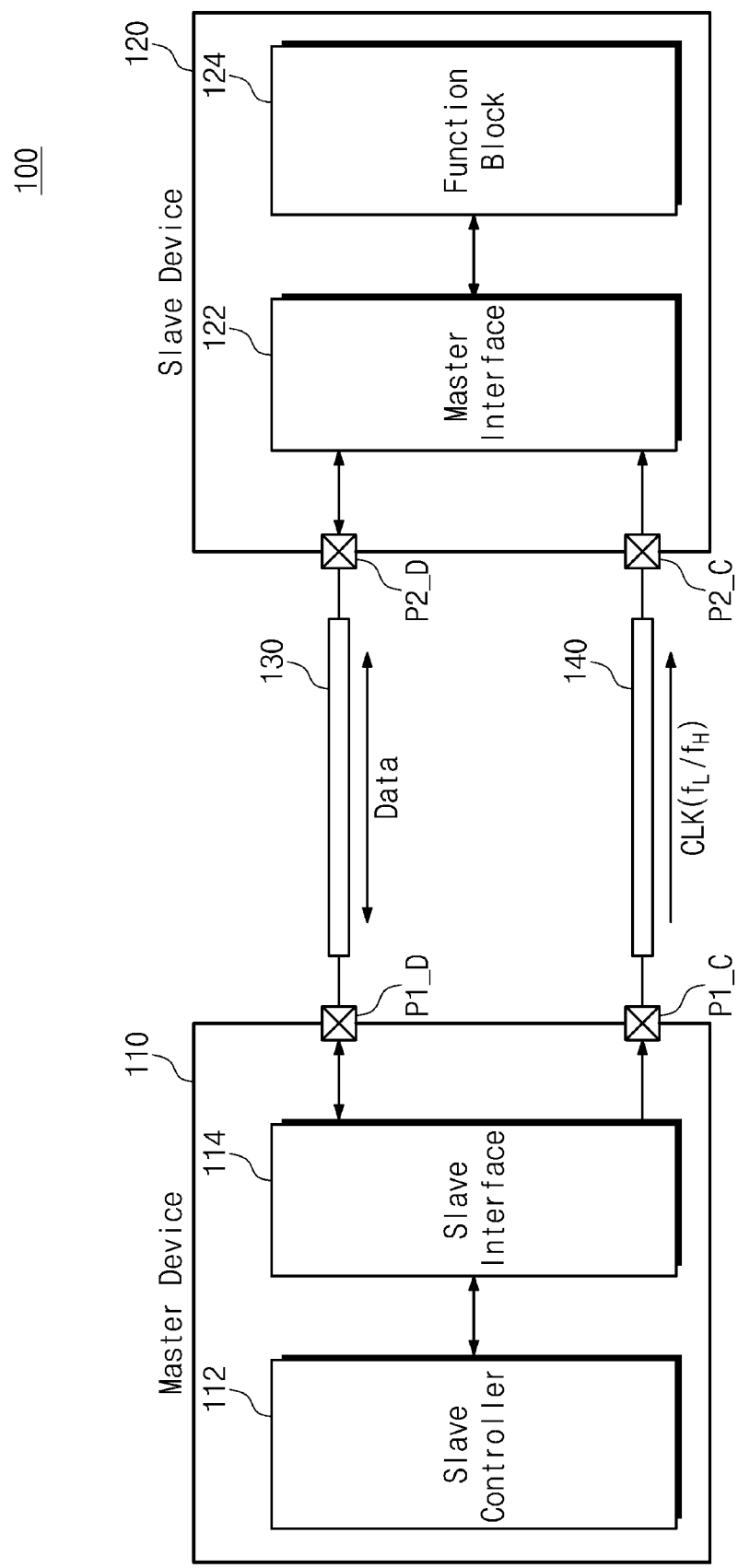
FIG. 1 illustrates a block diagram of a mobile device according to an embodiment of the inventive concepts.

FIG. 1 illustrates a block diagram of a mobile device according to an embodiment of the inventive concepts. Referring to FIG. 1, a mobile device 100 includes a master device 110 and a slave device 120. The master device 110 is connected with the slave device 120 through one serial data line 130 and one serial clock line 140.

The master device 110 includes a slave controller 112 and a slave interface 114. The slave controller 112 may generate data to be provided to the slave device 120. For example, the slave controller 112 may generate a command CMD to be provided to the slave device 120, or data to be written in the slave device 120. The slave controller 112 may generate data for the configuration or operating mode of the slave device 120 depending on a request of the master device 110, and may provide the generated data to the slave interface 114. Alternatively, the slave controller 112 may receive reception data RX_DATA from the slave device 120 through the slave interface 114. The slave controller 112 may check an operating status of the slave device 120, or may check whether a directed operation is processed, by using the reception data RX_DATA.

The slave interface 114 transmits transmission data TX_DATA to the slave device 120 by using the serial data line 130 through which data are bidirectionally transmitted. The slave interface 114 receives the reception data RX_DATA transmitted from the slave device 120 through the serial data line 130 and provides the reception data RX_DATA to the slave controller 112. The slave interface 114 outputs the transmission data TX_DATA to the serial data line 130 connected to a pad P1_D in synchronization with a clock signal CLK. At the same time, the slave interface 114 outputs the clock signal CLK to the serial clock line 140 through a pad P1_C. In this case, the slave device 120 may receive the transmission data TX_DATA transmitted through the serial data line 130 by using the clock signal CLK transmitted through the serial clock line 140.

In addition, the slave interface 114 outputs the clock signal CLK for the purpose of reading data from the slave device 120. The slave interface 114 latches the reception data RX_DATA output from the slave device 120 in synchronization with the clock signal CLK, and provides the reception data RX_DATA to the slave controller 112. When exchanging data with the slave device 120, the slave interface 114 generates the clock signal CLK, the frequency of which varies with a direction of data to be transmitted. The slave interface 114 may transmit or receive data by using the generated clock signal CLK, and may simultaneously provide the clock signal CLK to the slave device 120 through the serial clock line 140.

For example, when transmitting the transmission data TX_DATA to the slave device 120, the slave interface 114 uses the clock signal CLK of a first frequency $f_H$. That is, when transmitting the transmission data TX_DATA to the slave device 120, the slave interface 114 drives the serial data line 130 by using the clock signal CLK of the first frequency $f_H$. In addition, the slave interface 114 may output the clock signal CLK of the first frequency $f_H$ to the slave device 120 to allow the slave device 120 to receive the transmission data TX_DATA.

In contrast, when receiving the reception data RX_DATA from the slave device 120, the slave interface 114 uses the clock signal CLK of a second frequency $f_L$ that is lower than the first frequency $f_H$. That is, the slave interface 114 uses the clock signal CLK of the relatively low frequency $f_L$ upon latching the reception data RX_DATA transmitted from the slave device 120. In addition, the slave interface 114 may output the clock signal CLK of the second frequency $f_L$ to allow the slave device 120 to drive the serial data line 130 with the reception data RX_DATA.

The slave device 120 receives a command or data (e.g., first data) transmitted from the master device 110 by using the serial data line 130 and the serial clock line 140. The slave device 120 may perform a specific operation in response to the received command or data, or may output data (e.g., second data) to the master device 110. The slave device 120 may include a pad P2_D for connection with the serial data line 130 and a pad P2_C for connection with the serial clock line 140.

The clock signal CLK that is used in the slave device 120 may be substantially the same as the clock signal CLK transmitted through the serial clock line 140. That is, in some embodiments of the inventive concepts the slave device 120 does not include circuits or means for adjusting or modulating the clock signal CLK transmitted through the serial clock line 140. Accordingly, in some embodiments the slave device 120 does not include a separate clock modulating circuit or a clock gating circuit for implementing a gain of a bandwidth. The slave device 120 has a clock path of a simple structure.

The slave device 120 as shown in FIG. 1 includes a master interface 122 and a function block 124. The master interface 122 receives data transmitted through the serial data line 130 and the clock signal CLK transmitted through the serial clock line 140. A command CMD or write data transmitted from the master device 110 may be included in data transmitted through the serial data line 130. Depending on the command CMD, the master interface 122 may write data in the function block 124, or may input an operating condition to the function block 124. Also, the master interface 122 may output data to the serial data line 130 in response to the command CMD from the master device 110.

The clock signal CLK transmitted through the serial clock line 140 is also used when the master interface 122 outputs data. In particular, in the case where data are transmitted from the slave device 120 to the master device 110 by using the serial data line 130, the clock signal CLK of the relatively low frequency $f_L$ may be input to the master interface 122. Hereinafter, the term "relatively low frequency" may be interchangeably used as the term "second frequency $f_L$". In any other cases except for the above-described case, the slave interface 114 may receive the clock signal CLK of the first frequency $f_H$ that is higher than the second frequency $f_L$.

The function block 124 may be a block that sets a function of performing an operation of the slave device 120 or an operating mode of the slave device 120. For example, the function block 124 may include a register set for setting an operating mode of the slave device 120. Alternatively, the function block 124 may store status information or log information of the slave device 120, or may output the status information or log information depending on a request of the master interface 122.

Here, each of the serial data line 130 and the serial clock line 140 connecting the master device 110 and the slave device 120 may be implemented with a single line. That is, the serial data line 130 may be implemented with a single wire or a single conductive line, which connects the data pad P1_D (or pin) of the master device 110 and the data pad P2_D (or pin) of the slave device 120. The serial clock line 140 may be implemented with a single wire or a single conductive line, which connects the clock pad P1_C (or pin) of the master device 110 and the clock pad P2_C (or pin) of the slave device 120.

A structure of the mobile device 100 of the inventive concepts is briefly described above. The mobile device 100 of the inventive concepts includes the master device 110 and the slave device 120 that are connected through the serial data line 130 through which data are bidirectionally transmitted. The master device 110 and the slave device 120 are connected through the serial clock line 140 for transmitting the clock signal CLK unidirectionally. The clock signal CLK of the relatively high frequency $f_H$, that is, the first frequency $f_H$, is transmitted when data are transmitted from the master device 110 to the slave device 120. In contrast, the clock signal CLK of the relatively low frequency $f_L$, that is, the second frequency $f_L$, is transmitted when data are transmitted from the slave device 120 to the master device 110. According to the clock signal CLK provided as described, data may be provided to the slave device 120 with a maximum frequency (the first frequency $f_H$) allowed by hardware without including a separate clock modulating means in the slave device 120.

Figure 2:
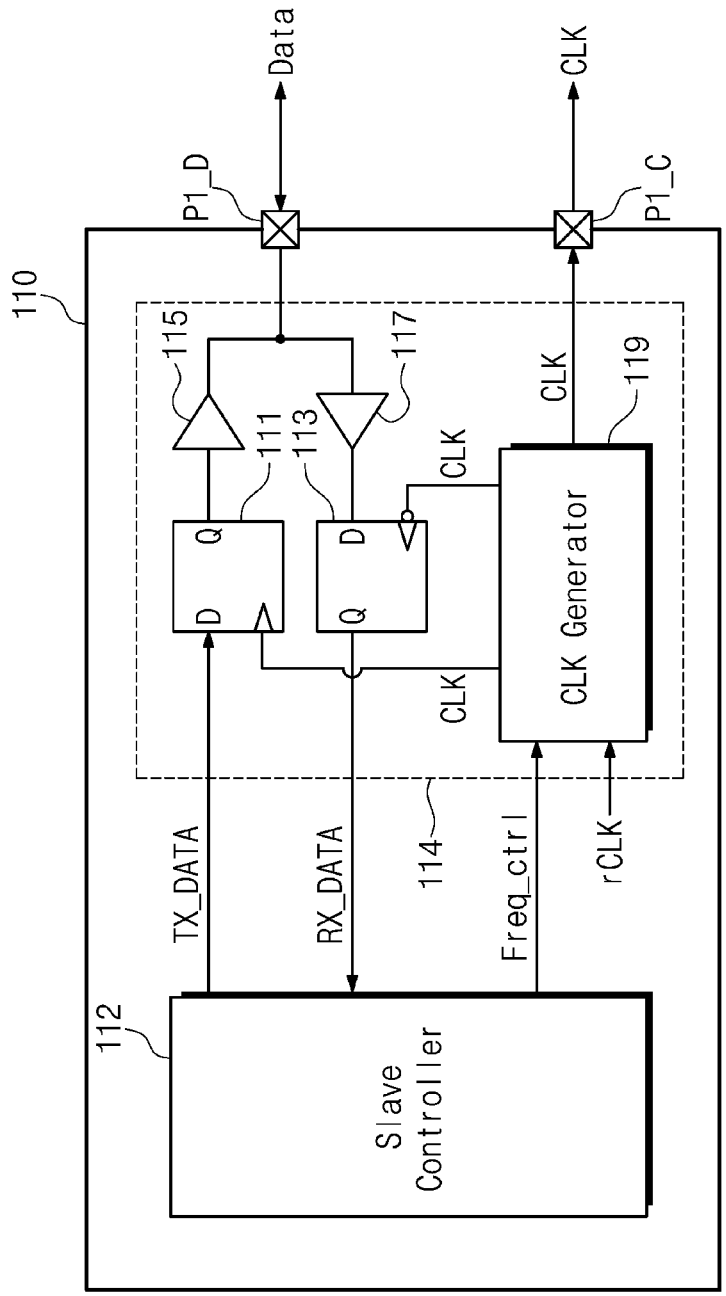
FIG. 2 illustrates a block diagram of an exemplary configuration of a master device illustrated in FIG. 1.

FIG. 2 illustrates a block diagram of an exemplary configuration of a master device illustrated in FIG. 1. Referring to FIG. 2, the master device 110 includes the slave controller 112 and the slave interface 114. The slave interface 114 includes flip-flops 111 and 113, drivers 115 and 117, and a clock generator 119.

As described with reference to FIG. 1, the slave controller 112 provides the slave interface 114 with the transmission data TX_DATA to be transmitted to the slave device 120 depending on a request of the master device 110. The slave controller 112 receives and processes the reception data RX_DATA provided from the slave interface 114. In particular, the slave controller 112 controls a frequency of the clock signal CLK, which is generated in the slave interface 114, through a frequency clock signal Freq_ctrl. The slave controller 112 sets a frequency of the clock signal CLK upon transmitting the transmission data TX_DATA to the slave device 120 and a frequency of the clock signal CLK for latching the reception data RX_DATA to different values.

The slave interface 114 outputs, through the pad P1_D, the transmission data TX_DATA provided from the slave controller 112. The pad P1_D may be connected with the slave device 120 through the serial data line 130 (refer to FIG. 1). The first flip-flop 111 triggered by the clock signal CLK and the first driver 115 are used to output the transmission data TX_DATA to the serial data line 130. The clock signal CLK provided to the first flip-flop 111 is generated by the clock generator 119. The clock signal CLK of the first frequency $f_H$ is provided to the first flip-flop 111 in a timing period where the transmission data TX_DATA are transmitted to the serial data line 130. In this case, the transmission data TX_DATA are transferred from an input terminal "D" of the first flip-flop 111 to an output terminal "Q" in synchronization with a rising edge of the clock signal CLK. The transmission data TX_DATA output from the output terminal "Q" of the first flip-flop 111 are level shifted to a signal level of the serial data line 130 by the first driver 115. The level-shifted data may be provided to the slave device 120 through the pad P1_D and the serial data line 130.

In contrast, the slave interface 114 includes the second driver 117 for the purpose of receiving the reception data RX_DATA provided from the slave device 120 through the pad P1_D. A signal level of data provided to the pad P1_D is shifted by the second driver 117. The level-shifted reception data RX_DATA may be provided to an input terminal "D" of the second flip-flop 113. The second flip-flop 113 latches the reception data RX_DATA provided to the input terminal "D" in synchronization with a falling edge of the clock signal CLK and transfers the latched data to an output terminal "Q". Here, it should be well understood that the second flip-flop 113 is not limited to being triggered as in synchronization with a falling edge of the clock signal CLK. That is, it should be well understood that in some embodiments the second flip-flop 113 may be implemented in a way to operate (or be triggered) in synchronization with a rising edge of the clock signal CLK. The reception data RX_DATA transferred to the output terminal "Q" of the second flip-flop 113 are provided to the slave controller 112. The clock signal CLK of the second frequency $f_L$ is provided to the second flip-flop 113 in a timing period where the reception data RX_DATA are input to the master device 110 through the serial data line 130. In addition, the slave interface 114 provides the clock signal CLK of the second frequency $f_L$ to the slave device 120 through the serial clock line 140 to allow the slave device 120 to drive the reception data RX_DATA.

In particular, the clock generator 119 generates the clock signal CLK in response to the frequency clock signal Freq_ctrl from the slave controller 112. The clock generator 119 generates the clock signal CLK, which is used by the slave interface 114 to send and receive data, by using a reference signal rCLK. The clock generator 119 may be implemented with, but is not limited to, a phase locked loop (PLL) circuit or a delay locked loop (DLL) circuit.

The clock generator 119 generates the clock signal CLK of the first frequency $f_H$ in a timing period where the transmission data TX_DATA are provided to the slave device 120. The transmission data TX_DATA are provided to the slave device 120 through the serial data line 130 in synchronization with the clock signal CLK of the first frequency $f_H$. The clock signal CLK of the first frequency $f_H$ is output to the serial clock line 140 (refer to FIG. 1) through the pad P1_C. In this case, the slave device 120 may receive the transmission data TX_DATA transmitted through the serial data line 130 by using the clock signal CLK of the first frequency $f_H$ thus transmitted.

In contrast the clock generator 119 generates the clock signal CLK of the second frequency $f_L$ in a timing period where the reception data RX_DATA are provided from the slave device 120 to the master device 110. The second frequency $f_L$ is lower than the first frequency $f_H$. The reception data RX_DATA are provided to the pad P1_D through the serial data line 130 in synchronization with the clock signal CLK of the second frequency $f_L$. In this case, the reception data RX_DATA are provided by the second driver 117 to be latched by the second flip-flop 113, which is triggered by the clock signal CLK of the second frequency $f_L$, and the latched reception data RX_DATA are provided to the slave controller 112. In particular, the clock generator 119 provides the clock signal CLK of the second frequency $f_L$ to the slave device 120 through the serial clock line 140. The slave device 120 may output the reception data RX_DATA to the serial data line 130 by using the clock signal CLK of the second frequency $f_L$.

An exemplary configuration of the master device 110 of the inventive concepts is described above. The master device 110 may provide the clock signal CLK of a frequency $f_L/f_H$ (i.e., the master device 110 may provide either the clock signal CLK of frequency $f_L$ or the clock signal CLK of frequency of $f_H$), which is differently determined depending on a direction of data to be transmitted through the serial data line 130, to the slave device 120. The master device 110 includes the clock generator 119 for providing the master device 110 with a clock signal, the frequency of which is differently determined in a transmit mode and a receive mode.

In a mode to transmit data through the serial data line 130, a delay difference of a data path and a clock path is not great. Accordingly, a limitation on a frequency of the clock signal CLK due to a delay difference of the data path and the clock path in the mode to transmit data is relatively small. As a result, in the mode to transmit data, the clock signal CLK of a relatively high frequency, that is, the first frequency $f_H$, is generated and provided to the slave device 120. In contrast, in a mode to receive data, a delay difference of the data path and the clock path is relatively great. Accordingly, it is difficult to make a frequency of the clock signal CLK higher. In the mode to receive data, the clock signal CLK of a relatively low frequency, that is, the second frequency $f_L$, is generated and provided to the slave device 120. A write speed associated with the slave device 120 increases by controlling a frequency of the clock signal CLK of the master device 110.

Figure 3:
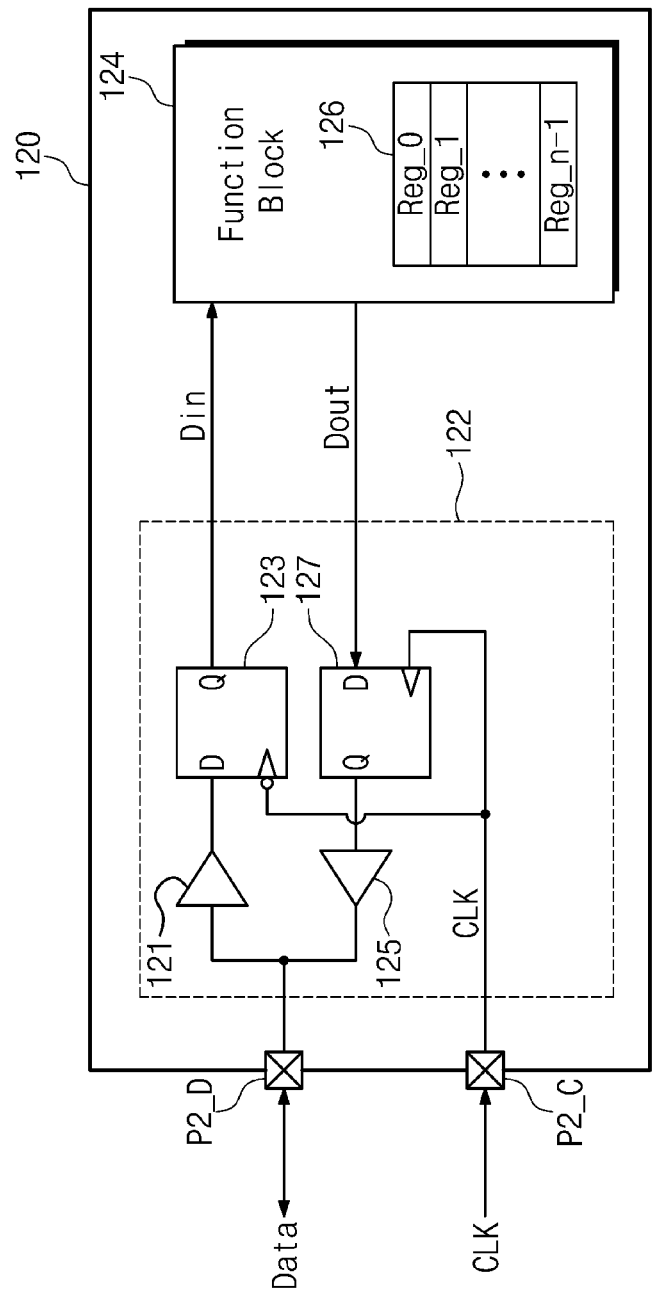
FIG. 3 illustrates a block diagram of an exemplary configuration of a slave device of FIG. 1.

FIG. 3 illustrates a block diagram of an exemplary configuration of a slave device of FIG. 1. Referring to FIG. 3, the slave device 120 includes the master interface 122 and the function block 124. The master interface 122 may exchange data with the master device 110 through the serial data line 130 and the serial clock line 140. The master interface 122 includes drivers 121 and 125, and flip-flops 123 and 127.

The master interface 122 receives data "DATA" provided from the master device 110 by using the serial data line 130 and the serial clock line 140. A command, an address, or write data may be included in the data "DATA" transmitted through the serial data line 130 depending on a serial interface protocol. The master interface 122 uses the clock signal CLK input to the pad P2_C through the serial clock line 140 for the purpose of receiving the data "DATA".

The clock signal CLK received by the master interface 122 is provided to a clock input terminal of the third flip-flop 123. The clock signal CLK may be inverted and input at the clock input terminal of the third flip-flop 123. It may be possible to compensate for a delay occurring in a data path by inverting the clock signal CLK. However, it should be well understood that the inversion of the clock signal CLK input to the third flip-flop 123 is only an example, and in other embodiments the clock signal CLK as input to the third flip-flop 123 is not inverted.

A signal level or intensity of the transmission data TX_DATA provided to the slave device 120 through the pad P2_D is adjusted by the third driver 121. The transmission data TX_DATA, the level of which is adjusted by the third driver 121, is provided to an input terminal "D" of the third flip-flop 123. The third flip-flop 123 latches the transmission data TX_DATA in synchronization with a falling edge of the clock signal CLK and transfers the latched data to an output terminal "Q". Here, it should be well understood that the third flip-flop 123 is not limited to being triggered in synchronization with a falling edge of the clock signal CLK, and that in some embodiments the clock signal CLK may be triggered in synchronization with a rising edge of the clock signal CLK. The transmission data TX_DATA transferred to the output terminal "Q" of the third flip-flop 123 are provided to the function block 124 as input data Din. The clock signal CLK of the first frequency $f_H$ is provided to the third flip-flop 123 in a timing period where the data "DATA" are input to the slave device 120 through the serial data line 130.

In contrast, in the case where the master interface 122 provides the reception data RX_DATA to the master device 110, the master interface 122 outputs output data Dout provided from the function block 124 to the pad P2_D by using the fourth flip-flop 127 and the fourth driver 125. In this case, a frequency of the clock signal CLK provided to the fourth flip-flop 127 corresponds to the second frequency $f_L$. The fourth flip-flop 127 transfers the output data Dout provided to the input terminal "D" to an output terminal "Q" in synchronization with a rising edge of the clock signal CLK. The fourth driver 125 drives the pad P2_D with data output from the output terminal "Q" of the fourth flip-flop 127. In this case, the data may be provided to the master device 110 through the pad P2_D and the serial data line 130 as the reception data RX_DATA.

The function block 124 may perform a unique function of the slave device 120, or may set a device for performing the unique function. For example, the function block 124 may include a plurality of register sets 126 indicated as Reg_0, Reg_1, . . . Reg_n−1. The master device 110 may write data in the register sets 126 for the purpose of setting an operation of the slave device 120. The size of data to be written in the register sets 126 of the slave device 120 may increase to provide various functions and various performances. There is a need to write data in the register sets 126 of the function block 124 at high speed for the purpose of minimizing reduction of performance. To this end, there is a need to increase a bandwidth with regard to data to be provided to the serial data line 130. In the inventive concepts, the clock signal CLK of the first frequency $f_H$ is provided in a timing period where the transmission data TX_DATA to be written in the register sets 126 are transmitted. In contrast, the clock signal CLK of the second frequency $f_L$ is provided in a timing period where the reception data RX_DATA, the size of which is small, are provided to the master device 110. That is, in the inventive concepts, a bandwidth associated with the serial data line 130 may vary with a write mode and a read mode of the slave device 120.

According to an exemplary configuration of the slave device 120 described above, by using the clock signal CLK provided from the master device 110 without modulation, the slave device 120 receives the transmission data TX_DATA or outputs the reception data RX_DATA. Accordingly, the slave device 120 may increase a bandwidth associated with the write mode without a separate configuration for controlling the clock signal CLK. This may mean that it is possible to implement the mobile device 100 capable of increasing the maximum throughput (or bandwidth) between the master device 110 and the slave device 120 with regard to the write mode.

Figure 4:
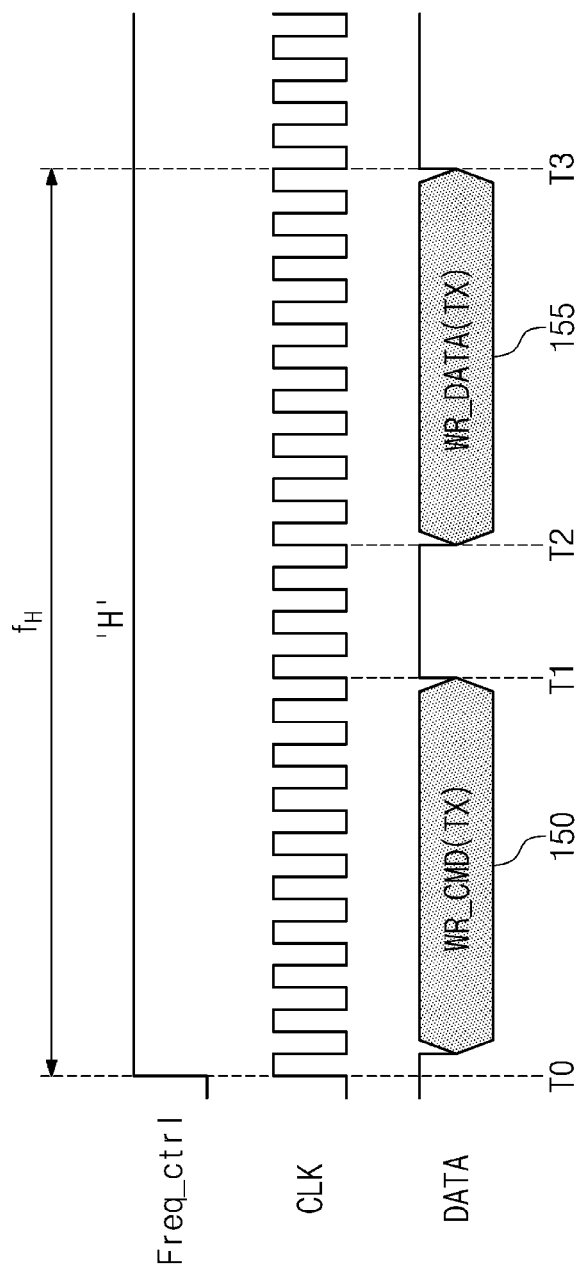
FIG. 4 illustrates a timing diagram of a method of transferring data and a clock signal, according to an embodiment of the inventive concepts.

FIG. 4 illustrates a timing diagram of a method of transferring data and a clock signal, according to an embodiment of the inventive concepts. Referring to FIGS. 2 to 4, the clock signal CLK of a relatively high frequency, that is, the first frequency $f_H$, may be provided in a timing period where data "DATA" (transmission data) are provided from the master device 110 to the slave device 120 through the serial data line 130. It is assumed that the slave controller 112 of the master device 110 writes data in the register sets 126 of the slave device 120.

At a time point T0, the slave controller 112 of the master device 110 may generate a write command WR_CMD (marked by a reference numeral 150 in FIG. 4) and may provide the write command WR_CMD to the slave interface 114. Also, the slave controller 112 provides the frequency clock signal Freq_ctrl of a high level (H) to the clock generator 119. The clock generator 119 may then generate the clock signal CLK of the first frequency $f_H$, and may provide the clock signal CLK to the first flip-flop 111 and the serial clock line 140. The write command WR_CMD may be provided to the serial data line 130 through the first driver 115 and the pad P1_D in synchronization with a rising edge of the clock signal CLK input to the first flip-flop 111. In this case, the slave device 120 may receive the write command WR_CMD by using the clock signal CLK of the first frequency $f_H$ transmitted through the serial clock line 140. Here, it should be well understood that address information of the register sets 126 is included in the write command WR_CMD.

At a time point T1, the slave device 120 completely receives the write command WR_CMD and is ready to receive write data WR_DATA (marked by a reference numeral 155 in FIG. 4) to be provided after a given number of clock cycles following the time point T1.

At a time point T2, the slave controller 112 generates the write data WR_DATA to be written in the register sets 126. The write data WR_DATA thus generated are provided to the slave interface 114. The slave controller 112 provides the frequency clock signal Freq_ctrl of the high level to the clock generator 119 for the purpose of providing the write data WR_DATA. The clock generator 119 may then generate the clock signal CLK of the first frequency $f_H$, and may provide the clock signal CLK to the first flip-flop 111 and the serial clock line 140. The write data WR_DATA may be provided to the serial data line 130 through the first driver 115 and the pad P1_D in synchronization with a rising edge of the clock signal CLK input to the first flip-flop 111. In this case, the slave device 120 may receive the write data WR_DATA by using the clock signal CLK of the first frequency $f_H$ transmitted through the serial clock line 140. The master interface 122 of the slave device 120 may write the received write data WR_DATA in the register sets 126 of the function block 124. Transmission of the write data WR_DATA is completed at time point T3.

According to the timing diagram described above, in the case where data are transmitted from the master device 110 to the slave device 120 through the serial data line 130, a frequency of the clock signal CLK for transmitting data is set to the first frequency $f_H$. Accordingly, the maximum throughput (or a bandwidth) may greatly increase with regard to data to be provided to the slave device 120.

Figure 5:
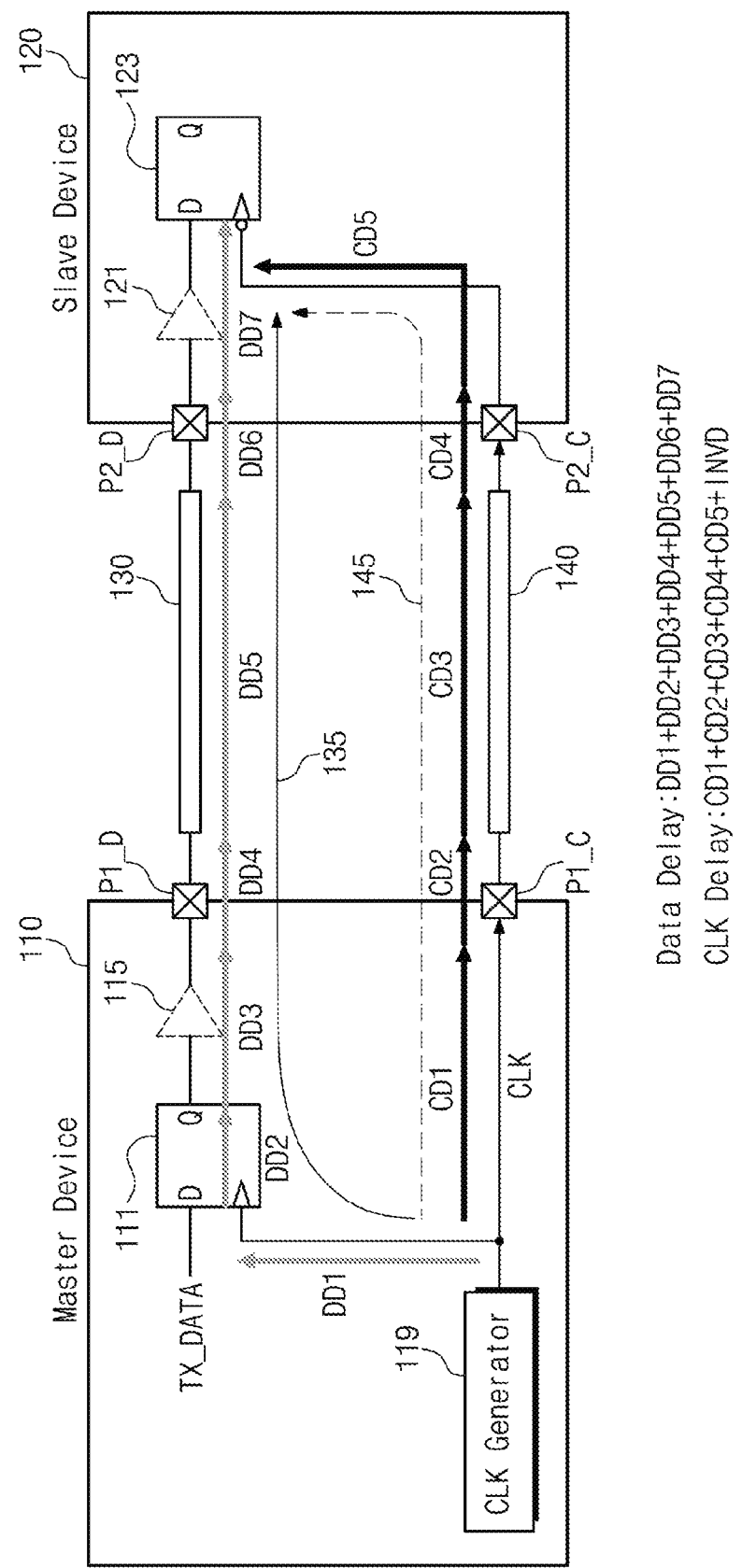
FIG. 5 illustrates a view of a data path and a clock signal path upon writing data in a slave device, according to an embodiment of the inventive concepts.

FIG. 5 illustrates a view of a data path and a clock signal path upon writing data in a slave device, according to an embodiment of the inventive concepts. A data path 135 and a clock path 145 corresponding to the case where data are provided to the slave device 120 are illustrated in FIG. 5.

First, the data path 135 includes the first flip-flop 111, the first driver 115, the pad P1_D, the serial data line 130, the pad P2_D, and the third driver 121. The clock path 145 may include a clock line from the clock generator 119 to the pad P1_C, and a clock line from the pad P1_C, the serial clock line 140, and the pad P2_C to the third flip-flop 123.

A delay difference of data and the clock signal CLK, which is substantially observed at the third flip-flop 123 upon transmitting data from the master device 110 to the slave device 120, is not relatively great. That is, a delay of data transmitted to the third flip-flop 123 through the data path 135 is modeled to "DD1+DD2+DD3+DD4+DD5+DD6+DD7" as illustrated in FIG. 5. That is, the data delay includes a clock transfer delay DD1 from the clock generator 119 to the first flip-flop 111. The data delay may include an input/output delay DD2 of the first flip-flop 111, a line delay DD3 (including the first driver 115) from the first flip-flop 111 to the pad P1_D, delays DD4 and DD6 of the pads P1_D and P2_D, a signal delay DD5 of the serial data line 130, and a line delay DD7 (including the third driver 121) between the pad P2_D and the third flip-flop 123.

A clock delay of the clock signal CLK provided from the clock generator 119 to the third flip-flop 123 is modeled to "CD1+CD2+CD3+CD4+CD5+INVD" as illustrated in FIG. 5. The clock delay may include a line delay from the clock generator 119 to the pad P1_C, delays CD2 and CD4 of the pads P1_C and P2_C, a signal delay CD3 of the serial clock line 140, and a line delay CD5 between the pad P2_C and the third flip-flop 123.

A delay factor that is present on the data path 135 and the clock path 145 may be included in a time delay due to switching of the flip-flop 111 or the drivers 115 and 121. Also, a time delay due to lumped or distributed constant circuits (e.g., impedance) present in the pads P1_D, P2_D, P1_C, and P2_C, the serial data line 130, or the serial clock line 140 may be included. However, a difference between a data delay and a clock delay may not be substantially great in a mode to transmit data from the master device 110 to the slave device 120. Accordingly, it may be possible to compensate for the data delay and the clock delay only by inverting the clock signal CLK at a clock input terminal of the third flip-flop 123. As a result, a limitation on a frequency due to a difference between the clock delay and the data delay is not great in the mode to transmit data from the master device 110 to the slave device 120. Accordingly, a frequency of the clock signal CLK may be adjusted to a sufficiently high frequency, that is, the first frequency $f_H$, upon transmitting data from the master device 110 to the slave device 120.

Figure 6:
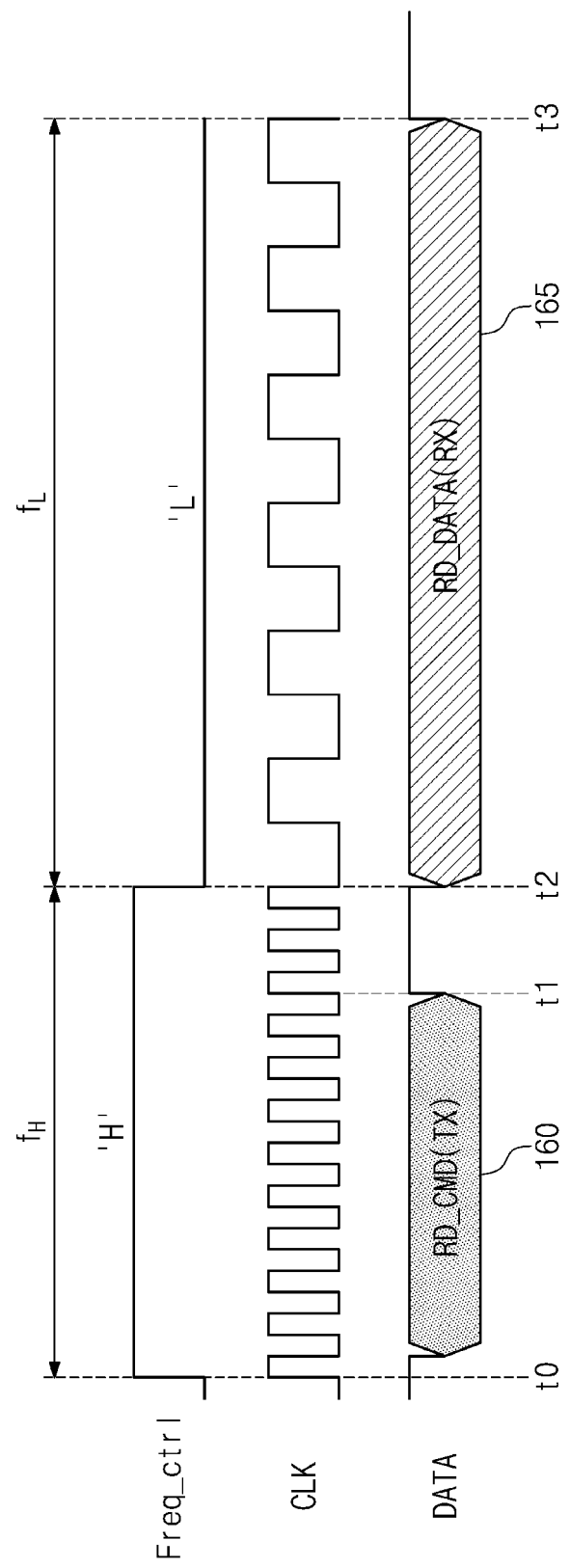
FIG. 6 illustrates a timing diagram of a method of reading data from a slave device, according to an embodiment of the inventive concepts.

FIG. 6 illustrates a timing diagram of a method of reading data from a slave device, according to an embodiment of the inventive concepts. Referring to FIGS. 2, 3, and 6, the clock signal CLK of a relatively high frequency, that is, the first frequency $f_H$, is provided in a timing period where data "DATA" are provided from the master device 110 to the slave device 120 through the serial data line 130. In contrast, the clock signal CLK of a relatively low frequency, i.e., the second frequency $f_L$, is provided in a timing period where data "DATA" are provided from the slave device 120 to the master device 110 through the serial data line 130.

At a time point t0, the slave controller 112 of the master device 110 generates a read command RD_CMD. The slave controller 112 may then provide the read command RD_CMD (marked by a reference numeral 160 in FIG. 6) to the slave interface 114. Also, the slave controller 112 provides the frequency clock signal Freq_ctrl of the high level to the clock generator 119 during a timing period where the read command RD_CMD is transmitted through the serial data line 130. In this case, during a time period where the read command RD_CMD are transmitted through the serial data line 130, the clock generator 119 generates the clock signal CLK of the first frequency $f_H$ and provides the clock signal CLK to the first flip-flop 111 and the serial clock line 140.

The read command RD_CMD may be provided to the serial data line 130 through the first driver 115 and the pad P1_D in synchronization with a rising edge of the clock signal CLK input to the first flip-flop 111. In this case, the slave device 120 may receive the read command RD_CMD by using the clock signal CLK of the first frequency $f_H$ transmitted to the serial clock line 140. Here, it should be well understood that address information is included in the read command RD_CMD.

At a time point t1, the function block 124 of the slave device 120 may prepare read data RD_DATA in response to the read command RD_CMD provided from the master device 110. The frequency of the clock signal CLK may be maintained at the first frequency $f_H$ during a time period t1 to t2 where the function block 124 prepares the read data RD_DATA.

At a time point t2, the slave controller 112 makes the frequency clock signal Freq_ctrl to transition to a low level (L) in response to the lapse of the timing period t1 to t2. In this case, the clock generator 119 changes a frequency of the clock signal CLK to the second frequency $f_L$. The clock signal CLK of the second frequency $f_L$ is transmitted from the clock generator 119 to the fourth flip-flop 127 through the serial clock line 140. The fourth flip-flop 127 outputs the read data RD_DATA provided from the function block 124 to the serial data line 130 in synchronization with the clock signal CLK of the second frequency $f_L$. Transmission of the read data RD_DATA is complete at time point t3.

The case where the read command RD_CMD is transmitted from the master device 110 to the slave device 120 through the serial data line 130, and the case where the read data RD_DATA are transmitted from the slave device 120 to the master device 110 are described above. The clock generator 119 generates the clock signal CLK of the first frequency $f_H$ in a data transmission mode TX mode where data such as the read command RD_CMD are transmitted from the master device 110 to the slave device 120. In contrast, in a data reception mode RX mode where the read data RD_DATA are provided from the slave device 120 to the master device 110, the clock generator 119 generates the clock signal CLK of the second frequency $f_L$ lower than the first frequency $f_H$.

Figure 7:
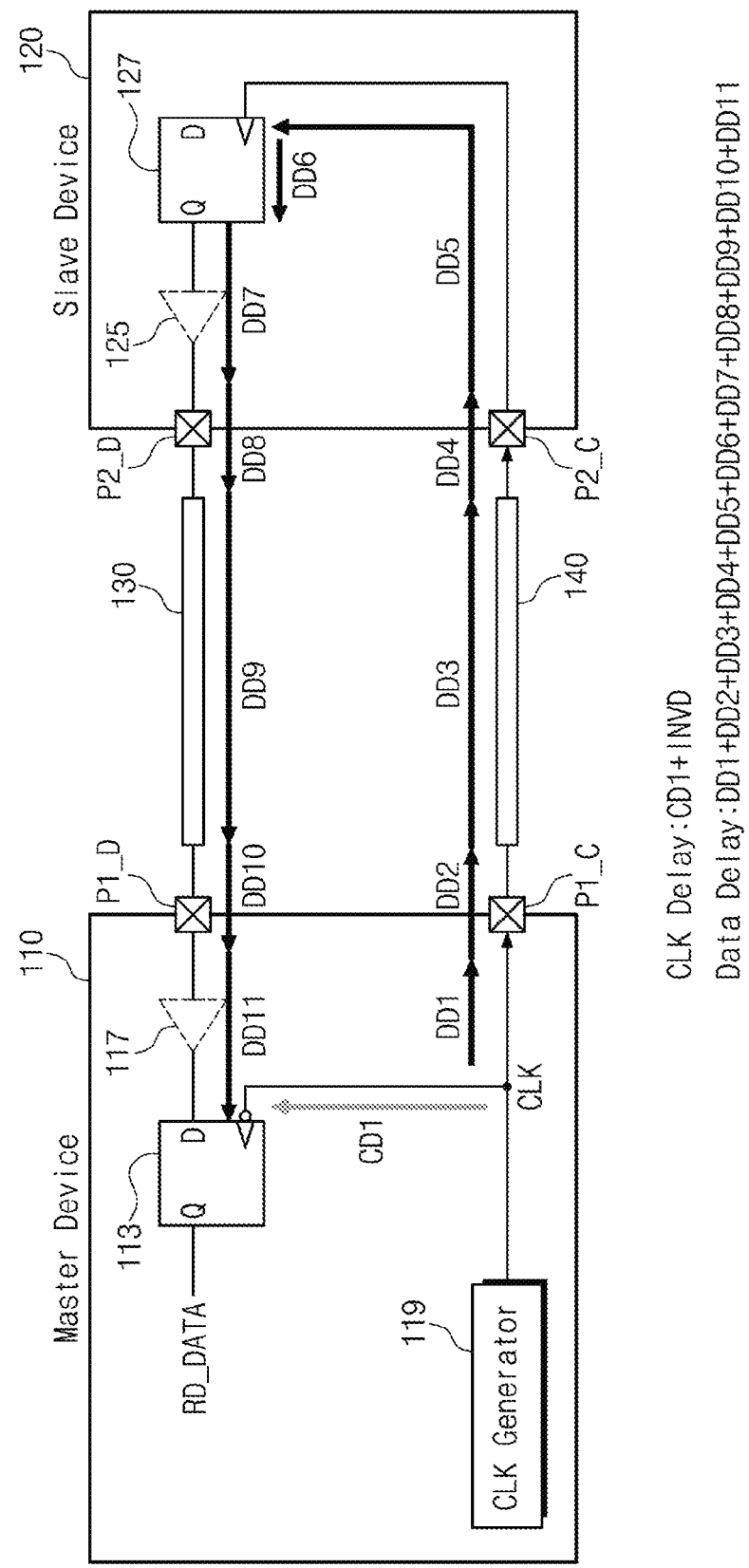
FIG. 7 illustrates a view of a data path and a clock signal path in an operating mode in which read data is received at a master device from a slave device, according to an embodiment of the inventive concepts.

FIG. 7 illustrates a view of a data path and a clock signal path in an operating mode in which read data is received at a master device from a slave device, according to an embodiment of the inventive concepts. It should be understood from FIG. 7 that a difference between a clock delay and a data delay is relatively great in a mode to receive data.

First, a clock delay of the clock signal CLK provided to the second flip-flop 113 may be modeled to "CD1+INVD". That is, with regard to the second flip-flop 113, the clock delay may correspond to a sum of a delay CD1 due to a clock line from the clock generator 119 to the second flip-flop 113, and a delay INVD due to inversion at a clock input terminal of the second flip-flop 113.

In contrast, a data delay of data provided from the slave device 120 to the master device 110 may be modeled to "DD1+DD2+DD3+DD4+DD5+DD6+DD7+DD8+DD9+ DD10+DD11". Here, the delay value of "DD1+DD2+DD3+ DD4+DD5+DD6" corresponds to a clock delay from the clock generator 119 to the fourth flip-flop 127. The delay value of "DD7+DD8+DD9+DD10+DD11" corresponds to a data delay from the fourth flip-flop 127 to the second flip-flop 113.

As described above, since the difference between the data delay (i.e., DD1 through DD11) and the clock delay (i.e., CD1+INVD) is great, it is difficult to secure a data holding margin due to a delay difference by only inverting the clock signal CLK input to the second flip-flop 113. Accordingly, the data holding margin of the second flip-flop 113 has to be secured by decreasing a frequency of a clock signal for transmitting data from the slave device 120 to the master device 110.

The mobile device 100 of the inventive concepts may adjust a frequency of the clock signal CLK generated in the mobile device 100 depending on a direction of data to be transmitted through the serial data line 130. That is, a frequency of the clock signal CLK may be set to the first frequency $f_H$ in a mode to transmit data from the master device 110 to the slave device 120. Here, the first frequency $f_H$ may be sufficiently high within a range where the first frequency $f_H$ is not affected by a delay difference of a data path and a clock path. In contrast, a frequency of the clock signal CLK may be adjusted to the second frequency $f_L$ lower than the first frequency $f_H$ in a mode wherein the master device 110 receives data from the slave device 120. Accordingly, even though a delay difference of the data path and the clock path is great, a data holding margin may be sufficiently secured at a data-received stage by decreasing a frequency of the clock signal CLK.

Figure 8:
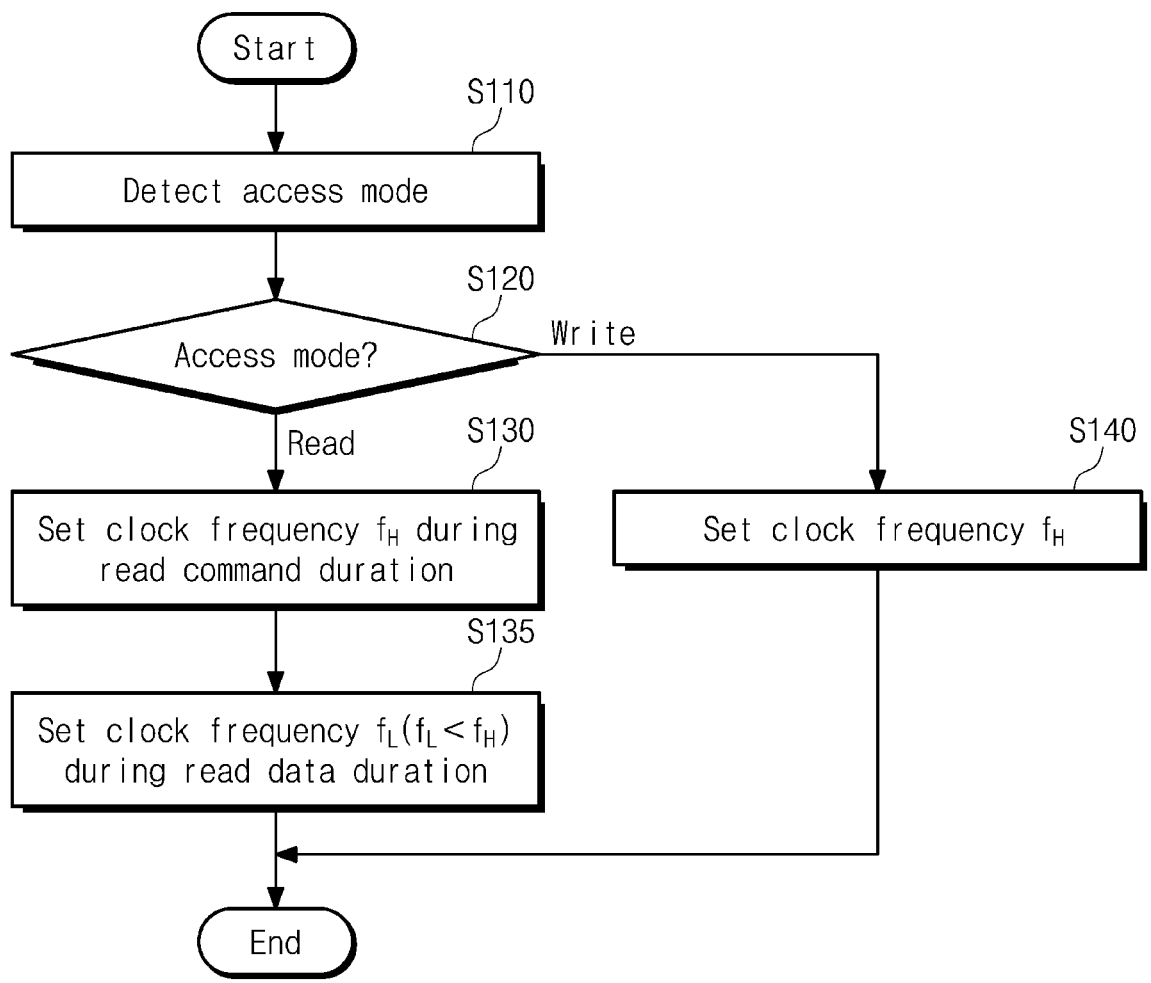
FIG. 8 illustrates a flowchart of a method of adjusting a frequency of a clock signal, which is performed in a master device in embodiments of the inventive concepts.

FIG. 8 illustrates a flowchart of a method of adjusting a frequency of the clock signal CLK, which is performed in a master device of the inventive concepts. Referring to FIG. 8, the slave controller 112 of the master device 110 controls a frequency of the clock signal CLK generated in the clock generator 119 (refer to FIG. 2) depending on an access mode associated with the slave device 120.

In operation S110, the slave controller 112 of the master device 110 detects an access request or mode to the slave device 120. For example, in the case where power-on or reset is performed for booting of the mobile device 100, the master device 110 may perform a write operation for setting the slave device 120. Alternatively, the master device 110 may perform a read operation for the purpose of receiving a status of the slave device 120 or a response to a specific command.

In operation S120, the master device 110 performs an operation branch depending on the detected access mode. In the case where the access mode is a read mode, the procedure proceeds to operation S130. In contrast, in the case where the access mode is a write mode, the procedure proceeds to operation S140.

In operation S130, the master device 110 sets a frequency of the clock signal CLK to the first frequency $f_H$ for the purpose of transmitting the read command RD_CMD to the slave device 120 through the serial data line 130. For example, the slave controller 112 may provide the frequency clock signal Freq_ctrl of the high level to the clock generator 119. In this case, the clock generator 119 may generate the clock signal CLK of the first frequency $f_H$ and may transmit the clock signal CLK to the first flip-flop 111 and to the third flip-flop 123 (see FIG. 3) through the serial clock line 140.

In operation S135, the master device 110 generates the clock signal CLK of the second frequency $f_L$ for the purpose of receiving the read data RD_DATA that are output in response to the read command RD_CMD. That is, the slave controller 112 may provide the frequency clock signal Freq_ctrl of the low level to the clock generator 119 in a timing period where the read data RD_DATA are input to the second flip-flop 113 through the serial data line 130. In this case, the clock generator 119 may generate the clock signal CLK of the second frequency $f_L$ and may transmit the clock signal CLK to the second flip-flop 113 and to the fourth flip-flop 127 (see FIG. 3) through the serial clock line 140. If the request read data RD_DATA are completely received, the slave controller 112 may make the frequency of the clock signal CLK to return to the first frequency $f_H$.

In operation S140, the master device 110 sets the frequency of the clock signal CLK to the first frequency $f_H$ for the purpose of transmitting the write command WR_CMD or the write data WR_DATA to the slave device 120 through the serial data line 130. The slave controller 112 may provide the frequency clock signal Freq_ctrl of the high level to the clock generator 119 in a timing period where the write command WR_CMD or the write data WR_DATA are transmitted. In this case, the clock generator 119 may generate the clock signal CLK of the first frequency $f_H$ and may transmit the clock signal CLK to the first flip-flop 111 and to the third flip-flop 123 through the serial clock line 140.

A method of setting a frequency of the clock signal CLK depending on an access mode where the master device 110 of the inventive concepts accesses the slave device 120 is described above. The master device 110 of the inventive concepts may obtain a bandwidth gain by changing a frequency of the clock signal CLK depending on a direction in which data are transmitted through the serial data line 130.

Figure 9:
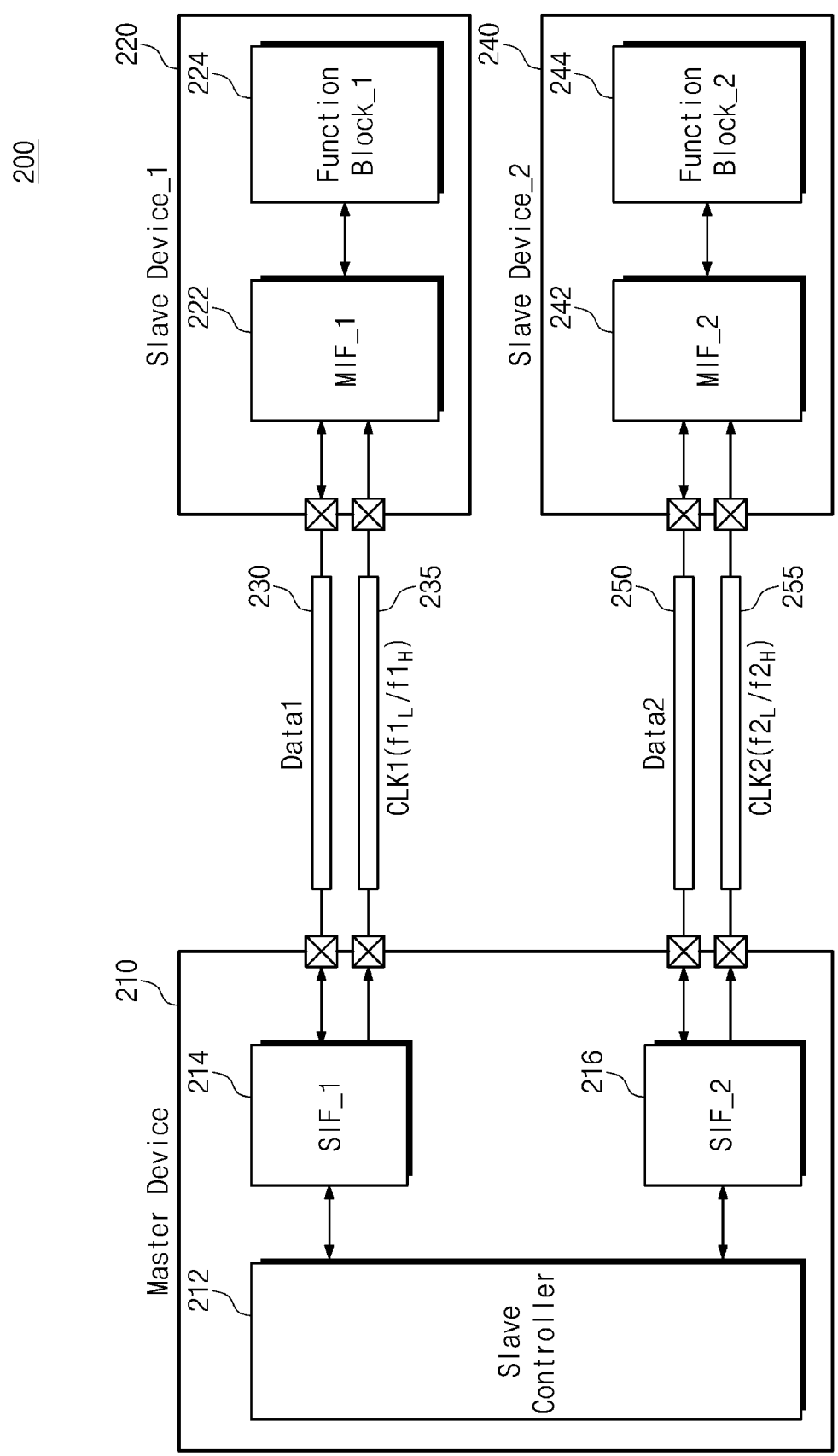
FIG. 9 illustrates a block diagram of a mobile device according to another embodiment of the inventive concepts.

FIG. 9 illustrates a block diagram of a mobile device according to another embodiment of the inventive concepts. Referring to FIG. 9, a mobile device 200 includes a master device 210 and at least two slave devices 220 and 240. The master device 210 and the slave device 220 may be connected through an interface including a serial data line 230 and a serial clock line 235. The master device 210 and the slave device 240 may be connected through an interface including a serial data line 250 and a serial clock line 255.

The master device 210 may include a slave controller 212 for controlling the slave devices 220 and 240, and slave interfaces 214 and 216. The first slave interface (SIF_1) 214 takes full charge of interfacing between the master device 210 and the first slave device 220. The second slave interface (SIF_2) 216 takes full charge of interfacing between the master device 210 and the second slave device 240.

The first slave device 220 includes a first master interface (MIF_1) 222 and a first function block 224. The second slave device 240 includes a second master interface (MIF_2) 242 and a second function block 244. The first slave device 220 and the second slave device 240 do not include a configuration for modulating or generating clock signals. By using only a first clock signal CLK1 provided from the master device 210, the first slave device 220 may receive data or may drive data to be output. By using only a second clock signal CLK2 provided from the master device 210, also, the second slave device 240 may receive data or may drive data to be output.

Data exchange between the slave controller 212, the first slave interface 214, and the first slave device 220 and transmission of the first clock signal CLK1 are substantially the same as those described with reference to FIG. 1. That is, a frequency of the first clock signal CLK1 is adjusted depending on a direction in which data Data1 are transmitted through the serial data line 230. For example, in the case where data are transmitted toward the first slave device 220 through the serial data line 230, the first clock signal CLK1 of a relatively high frequency $f1_H$ may be generated. In contrast, in the case where data are transmitted toward the master device 210 from the first slave device 220 through the serial data line 230, the first clock signal CLK1 of a relatively low frequency $f1_L$ may be generated.

Data exchange between the slave controller 212, the second slave interface 216, and the second slave device 240 and transmission of a second clock signal CLK2 are substantially the same as those described with reference to FIG. 1. A frequency of the second clock signal CLK2 is adjusted depending on a direction in which data Data2 are transmitted through the serial data line 250. For example, in the case where data are transmitted toward the second slave device 240 through the serial data line 250, the second clock signal CLK2 of a relatively high frequency $f2_H$ may be generated. In contrast, in the case where data are transmitted toward the master device 210 from the second slave device 240 through the serial data line 250, the first clock signal CLK2 of a relatively low frequency $f2_L$ may be generated.

Figure 10:
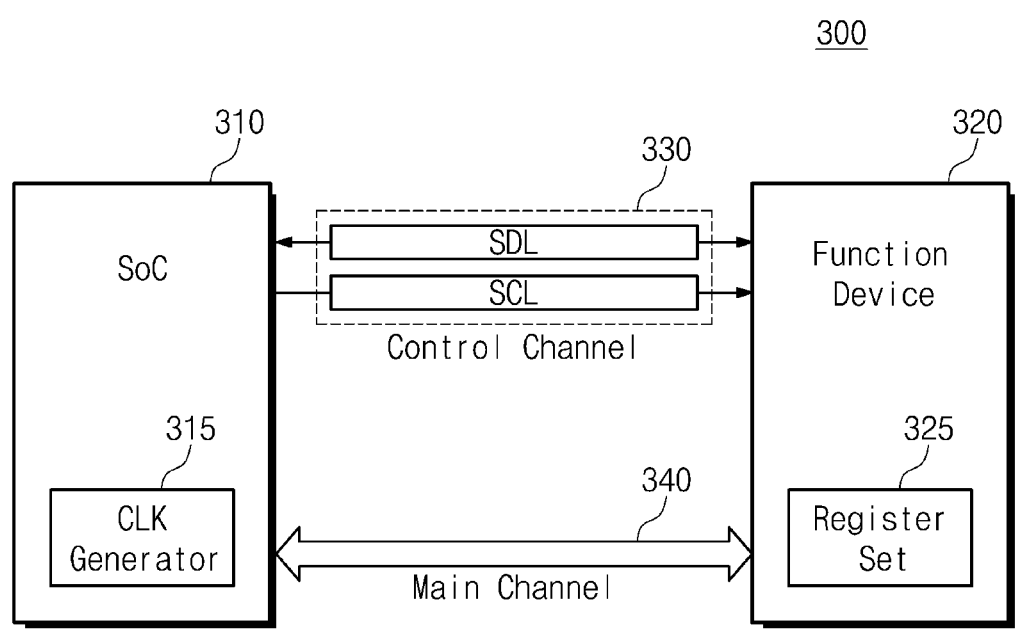
FIG. 10 illustrates a block diagram of a mobile device according to another embodiment of the inventive concepts.

FIG. 10 illustrates a block diagram of a mobile device according to another embodiment of the inventive concepts. Referring to FIG. 10, a mobile device 300 includes a system-on-chip (SoC) 310 provided as a master device and a function device 320 provided as a slave device. Here, the system-on-chip 310 and the function device 320 may be implemented with separate chips, respectively.

The system-on-chip 310 and the function device 320 may independently communicate with each other through a control channel 330 and a main channel 340. For example, the system-on-chip 310 may control the function device 320 through the control channel 330. Also, the system-on-chip 310 and the function device 320 may exchange data through the main channel 340.

Here, the control channel 330 may operate to be the same as a serial interface that performs communication between the master device 110 and the slave device 120 of FIG. 1. That is, the control channel 330 may include a serial data line SDL for transmitting data bidirectionally, and a serial clock line SCL for transmitting the clock signal CLK unidirectionally from the system-on-chip 310 to the function device 320.

If the control channel 330 is activated, a clock generator 315 of the system-on-chip 310 may generate the clock signal CLK to be transmitted to the function device 320 through the serial clock line SCL. The clock generator 315 may change a frequency of the clock signal CLK depending on a direction in which data are transmitted through the serial data line SDL. For example, in the case where data are transmitted toward the function device 320 through the serial data line SDL, the clock signal CLK of a relatively high frequency, that is, the first frequency $f_H$, may be generated. In contrast, in the case where data are transmitted toward the system-on-chip 310 through the serial data line SDL, the clock signal CLK of a relatively low frequency, that is, the second frequency $f_L$, may be generated.

Here, an example is described in which a frequency of the clock signal CLK switches between the first frequency $f_H$ and the second frequency $f_L$, but the inventive concepts are not limited thereto. That is, it should be well understood that in some embodiments a frequency of the clock signal CLK may be changed to any one of three or more frequencies.

The system-on-chip 310 may write data in a register set 325 provided in the function device 320 by using the control channel 330. In addition, the system-on-chip 310 may receive debugging or response data of the function device 320 by using the control channel 330.

Figure 11:
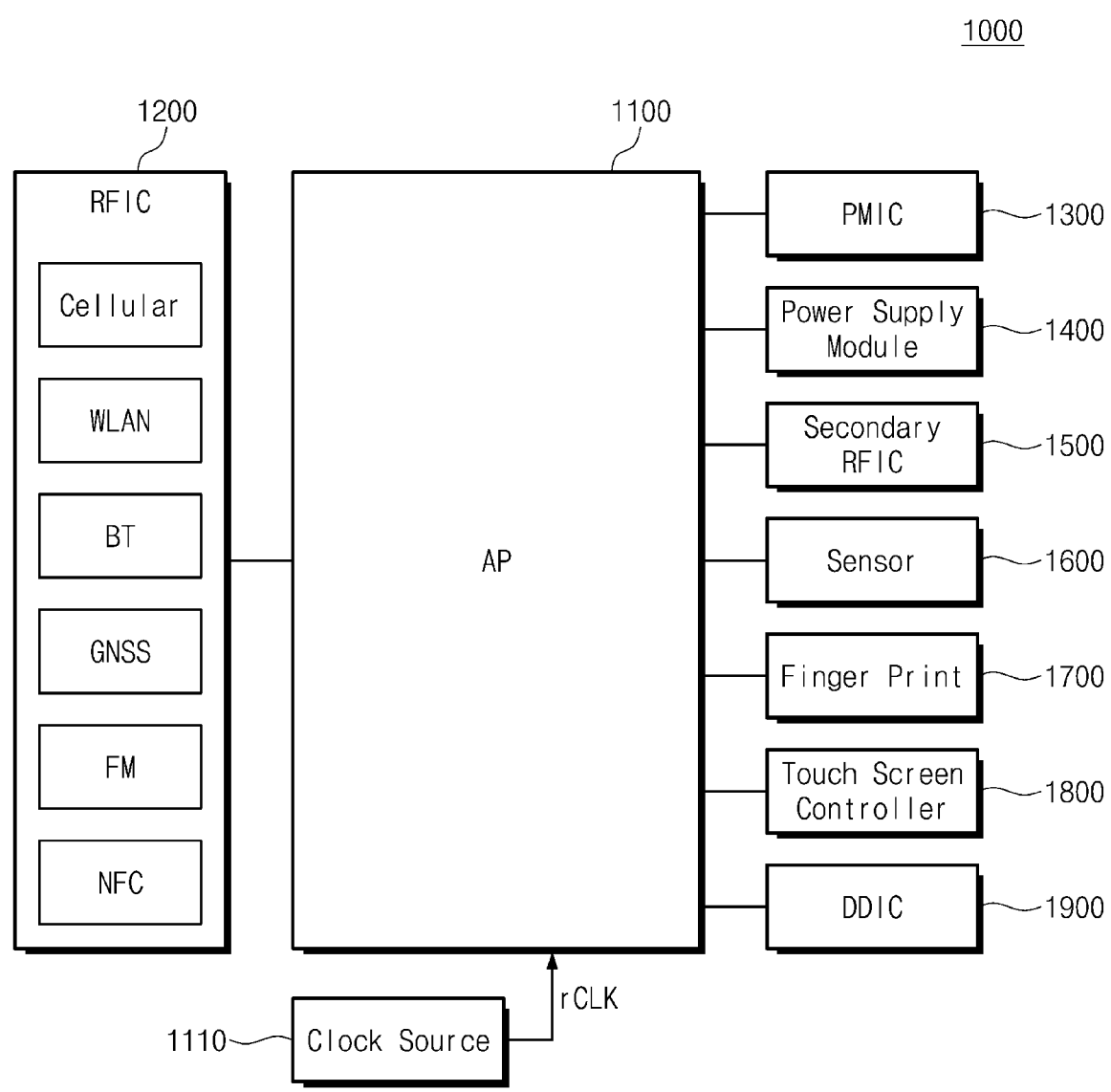
FIG. 11 illustrates a block diagram of an example of a data processing system according to an embodiment of the inventive concepts.

FIG. 11 illustrates a block diagram of an example of a data processing system 1000 according to an embodiment of the inventive concepts. Referring to FIG. 11, an application processor (AP) 1100 that operates as a master device may control a plurality of slave devices 1200 to 1900. A serial data line for bidirectional data exchange and a serial clock line may be implemented between the application processor 1100 and each of the slave devices 1200 to 1900. A clock source 1110 provides a reference signal rCLK, and application processor 1100 may generate a clock signal CLK such as described with respect to FIGS. 1-8. The application processor 1100 may for example be implemented with a baseband modem processor chip, a chip performing both a function of a modem and a function of an AP, an AP, a mobile AP or the like, but is not limited thereto.

The slave devices 1200 to 1900 may include an RFIC 1200, a power management integrated circuit (PMIC) 1300, a power supply module 1400, a secondary RFIC 1500, a sensor 1600, a fingerprint recognition sensor 1700, a touch screen controller 1800, and a digital display interface (or a display driver IC) (DDI) chip 1900. The RFIC 1200 may include at least one connection chip. The connection chip may for example include a chip for mobile communication (e.g., cellular), a chip WLAN communication, a chip for Bluetooth communication, a chip for global navigation satellite system (GNSS), a chip for processing FM audio/video, a chip for near field communication (NFC), and/or a chip for Wi-Fi communication, but is not limited thereto.

As described above, in the application processor 1100 and the slave devices 1200 to 1900, a frequency of a clock signal may be adjusted depending on a direction in which data are transmitted through a serial data line. Accordingly, it may be possible to reduce the number of pins for connecting the application processor 1100 and each of the slave devices 1200 to 1900, and to simply implement a structure of each of the slave devices 1200 to 1900. That is, it may be possible to sufficiently secure a bandwidth, that is, the maximum throughput with regard to data transmitted from a master device to a slave device while reducing costs for implementing the application processor 1100 and the slave devices 1200 to 1900.

As described above, according to the inventive concept, it may be possible to implement a mobile device that exchanges data internally while changing a bandwidth (or the maximum throughput) depending on a transmission direction between a master device and a slave device. Accordingly, the mobile device capable of markedly increasing the bandwidth associated with write data by using a simple structure may be provided.

While the inventive concepts have been described with reference to exemplary embodiments thereof, it should be apparent to those of ordinary skill in the art that various changes and modifications may be made thereto without departing from the spirit and scope of the inventive concepts as set forth in the following claims.

What is claimed is:

1. A mobile device comprising:
a slave device configured to receive first data provided through a serial data line in synchronization with a clock signal provided through a serial clock line, and to output second data to the serial data line in synchronization with the clock signal; and
a master device configured to generate the clock signal and to provide the first data to the serial data line in synchronization with the clock signal, and to receive the second data from the serial data line in synchronization with the clock signal,
wherein the master device is configured to generate the clock signal as having a first frequency upon transmitting the first data, and to generate the clock signal as having a second frequency upon receiving the second data, wherein the second frequency is lower than the first frequency.

2. The mobile device of claim 1, wherein the master device comprises:
a slave controller configured to generate a frequency control signal for adjusting a frequency of the clock signal depending on the first data or the second data; and
a slave interface configured to generate the clock signal in response to the frequency control signal, and to provide the first data to the serial data line depending on the clock signal and receive the second data from the serial data line depending on the clock signal.

3. The mobile device of claim 2, wherein the slave interface comprises:
a clock generator configured to generate the clock signal depending on the frequency control signal;
a first flip-flop configured to output the first data to the serial data line depending on the clock signal; and
a second flip-flop configured to receive the second data from the serial data line depending on the clock signal.

4. The mobile device of claim 3, wherein the slave device comprises:
a third flip-flop configured to receive the first data transmitted through the serial data line in response to the clock signal transmitted through the serial clock line; and
a fourth flip-flop configured to output the second data to the serial data line in response to the clock signal.

5. The mobile device of claim 4, wherein the slave device comprises a function block including a register set in which the first data are stored.

6. The mobile device of claim 4, wherein the slave device is configured to trigger the third flip-flop or the fourth flip-flop using the clock signal without modulating the clock signal.

7. The mobile device of claim 1, wherein the first data comprises at least one of a command, an address, and setting data for the slave device.

8. The mobile device of claim 7, wherein the second data comprises status data or debugging data for the master device.

9. The mobile device of claim 1, wherein each of the serial data line and the serial clock line is implemented with a single conductive line.

10. A mobile device comprising:
a slave device configured to communicate using a serial clock line and a serial data line; and
a master device configured to transmit a clock signal to the slave device using the serial clock line, and to communicate with the slave device through the serial data line,
wherein the master device is configured to change a frequency of the clock signal depending on a direction in which data are transmitted through the serial data line.

11. The mobile device of claim 10, wherein the serial data line is a bidirectional signal line, and the serial clock line is a unidirectional signal line.

12. The mobile device of claim 10, wherein the data comprises transmission data and reception data, and the master device is configured to generate the clock signal as having a first frequency during a mode for transmitting the transmission data to the slave device through the serial data line, and to generate the clock signal as having a second frequency during a mode for receiving the reception data from the slave device,
wherein the second frequency is lower than the first frequency.

13. The mobile device of claim 12, wherein the master device comprises:
a slave controller configured to control the frequency of the clock signal depending on whether the master device is in the mode for transmitting or the mode for receiving; and
a slave interface configured to output the transmission data to the serial data line and receive the reception data input from the serial data line, and to output the clock signal to the serial clock line, under control of the slave controller.

14. The mobile device of claim 13, wherein the slave interface comprises:
a clock generator configured to generate the clock signal under the control of the slave controller;
a first flip-flop configured to output the transmission data to the serial data line depending on the clock signal; and
a second flip-flop configured to receive the reception data from the serial data line depending on the clock signal.

15. The mobile device of claim 14, wherein the slave interface further comprises:

a first driver connected between an output terminal of the first flip-flop and the serial data line, and configured to drive the transmission data; and
a second driver connected between an input terminal of the second flip-flop and the serial data line, and configured to adjust a level of the reception data.

16. The mobile device of claim 10, wherein the data comprises transmission data and reception data, and the slave device comprises:
a first flip-flop configured to receive the transmission data transmitted through the serial data line in response to the clock signal transmitted through the serial clock line; and
a second flip-flop configured to output the reception data to the serial data line in response to the clock signal transmitted through the serial clock line.

17. The mobile device of claim 16, wherein the first flip-flop is configured to be triggered by an inverted version of the clock signal to receive the transmission data.

18. The mobile device of claim 16, wherein the slave device further comprises a function block including a register set in which write data including the transmission data are stored.

19. An interfacing method of a mobile device which includes a master device and a slave device connected through a bidirectional serial data line and a unidirectional serial clock line, the method comprising:
detecting, by the master device, an access request to the slave device;
determining, by the master device, whether the access request is a write request or a read request; and
upon determining that the access request corresponds to the read request,
transmitting, by the master device, a clock signal having a first frequency to the unidirectional serial clock line and a read command corresponding to the access request to the bidirectional serial data line in synchronization with the clock signal having the first frequency, and
after the transmitting the clock signal having the first frequency and the read command, transmitting, by the master device, a clock signal having a second frequency to the unidirectional serial clock line, and receiving, by the master device, read data corresponding to the access request transmitted through the bidirectional serial data line using the clock signal having the second frequency,
wherein the first frequency is higher than the second frequency.

20. The method of claim 19, wherein upon determining that the access request corresponds to the write request, further comprising transmitting, by the master device, the clock signal having the first frequency to the unidirectional serial clock line, and transmitting a write command and write data to the bidirectional serial data line in synchronization with the clock signal having the first frequency.

* * * * *